(12) United States Patent
Gentric

(10) Patent No.: US 8,325,077 B2
(45) Date of Patent: Dec. 4, 2012

(54) METHOD OF DISTRIBUTING MULTIMEDIA CONTENT

(75) Inventor: Philippe Gentric, La Colle sur Loup (FR)

(73) Assignee: NXP B.V., Eindhoven (NL)

( * ) Notice: Subject to any disclaimer, the term of this patent is extended or adjusted under 35 U.S.C. 154(b) by 1011 days.

(21) Appl. No.: 11/574,238

(22) PCT Filed: Aug. 11, 2005

(86) PCT No.: PCT/IB2005/052666
§ 371 (c)(1),
(2), (4) Date: Mar. 6, 2009

(87) PCT Pub. No.: WO2006/021909
PCT Pub. Date: Mar. 2, 2006

(65) Prior Publication Data
US 2009/0210693 A1    Aug. 20, 2009

(30) Foreign Application Priority Data
Aug. 27, 2004   (EP) .................................. 04300558

(51) Int. Cl.
*G08C 19/12*  (2006.01)
(52) U.S. Cl. ................... 341/173; 369/47.16; 386/239
(58) Field of Classification Search ............ 341/173
See application file for complete search history.

(56) References Cited

U.S. PATENT DOCUMENTS

| | | | |
|---|---|---|---|
| 2002/0037000 A1* | 3/2002 | Park et al. ..................... | 370/349 |
| 2003/0007507 A1  | 1/2003 | Rajwan et al. | |
| 2003/0085902 A1* | 5/2003 | Vogelaar et al. .............. | 345/505 |
| 2003/0091338 A1* | 5/2003 | Snow et al. .................... | 386/96 |
| 2003/0097629 A1  | 5/2003 | Moon | |
| 2004/0021588 A1  | 2/2004 | Luby | |
| 2004/0128343 A1  | 7/2004 | Mayer | |

FOREIGN PATENT DOCUMENTS

| | | |
|---|---|---|
| EP | 1 083 660 A | 3/2001 |
| EP | 1187423 A2  | 3/2002 |
| WO | 02/49342 A  | 6/2002 |
| WO | 2003085928 A1 | 10/2003 |

* cited by examiner

*Primary Examiner* — Brian A Zimmerman
*Assistant Examiner* — Omer S Khan

(57) ABSTRACT

The present invention relates to a system for distributing multimedia content to at least one client device over a network. Said system comprises: a slicer (SLI) for slicing the multimedia content into a set of slices; a coder (ALC) for coding a slice according to an asynchronous layer coding technique such that N coded symbols including K source symbols and N−K error symbols are generated; a content server (SER) for storing and transmitting said coded slices upon request of the client device; a client device (CLD) comprising means for receiving said coded slices and a decoder (DEC) for decoding a coded slice as soon as K coded symbols of said slice have been received.

6 Claims, 1 Drawing Sheet

METHOD OF DISTRIBUTING MULTIMEDIA CONTENT

FIELD OF THE INVENTION

The present invention relates to a method of and a system for distributing multimedia content to at least one client device. The invention also relates to a processing device and a client device specifically designed to implement such a distribution method.

The invention has applications for the transmission of pay content to client devices via the Internet, for example for the transmission of live content (live events, live shows, broadcast TV programs and the like).

BACKGROUND OF THE INVENTION

European patent application n° 1 187 423 describes a method of transmitting on-demand information whose content varies with time, like music or video. In particular, it describes a so-called buffering distribution method that consists in dividing a single piece of content into a plurality of files (also called slices) and in downloading the content file by file, starting from the first file. This buffering distribution method is described as providing the advantage of reducing the waiting time before starting playback (while part N is being downloaded, part N−1 can be played).

However, when a slice is transmitted in the form of packets using a non-reliable protocol, some errors might occur during the transmission of packets.

A first solution to this problem is the conventional data carrousel, used for example in satellite broadcasting network. Thanks to this data carrousel, a file is played cyclically and is accessed packet by packet. But, when a packet of a file is corrupted or lost, the receiver must wait until the carousel cycles again to get the missing packet so that the time to wait is the duration of the file.

A second solution is retransmission. In this case, when a packet is lost, the receiver must ask for it to be transmitted again, which is not possible if there is no return channel (e.g. pure broadcast) and does not scale well otherwise because the sender can get very busy sending retransmitted packets for each receiver. The bandwidth usage can be also dramatically increased when many retransmissions are required.

SUMMARY OF THE INVENTION

It is an object of the invention to propose a method of and a system for distributing multimedia content to at least one client device, which reduces the waiting time compared with the one of the prior art.

To this end, the distribution method in accordance with the invention is characterized in that it comprises the steps of:
  slicing the multimedia content into a set of slices;
  coding a slice according to an asynchronous layer coding technique such that N coded symbols including K source symbols and N−K error symbols are generated;
  transmitting said coded slices upon request of the client device;
  receiving said coded slices on a client device;
  decoding a coded slice on said client device as soon as K coded symbols of said slice have been received.

As a consequence, such a distribution method works with random losses and is also robust to order-of-arrival problems. The receiver, namely the client device, simply has to wait until K symbols are received (plus the time it takes to decode them), whichever these symbols are, before it can play the multimedia content. This is very advantageous compared with the prior art techniques.

Beneficially, the multimedia content is under a compressed format. According to an embodiment of the invention, the multimedia content is compressed at a bit rate R and wherein the coded slices are transmitted at a bit rate N/K*R. Live distribution is then made possible since the transmission bit rate takes into account the N−K additional error symbols generated by the asynchronous layer coding step.

Beneficially, the step of slicing is adapted to divide the compressed multimedia content into a set of slices which can be decompressed independently. Therefore, it is not necessary to concatenate the decoded slices to decompress and play the multimedia content.

According to another embodiment of the invention, the coded slices are transmitted over different channels and the distribution method further comprises the step of buffering decoded slices on the client device. A very fast distribution of the multimedia content is then made possible since, depending on the available bandwidth, it is possible to transmit each slice over a different channel and to receive all the slices after a maximum waiting time equal to the transmission duration of a slice. In other words, the more channels a receiver gets, the faster the original multimedia content will be reconstructed, at the cost of a higher bandwidth.

The present invention also relates to a system for distributing multimedia content to at least one client device over a network including a processing device and a client device specifically designed to implement such a distribution method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
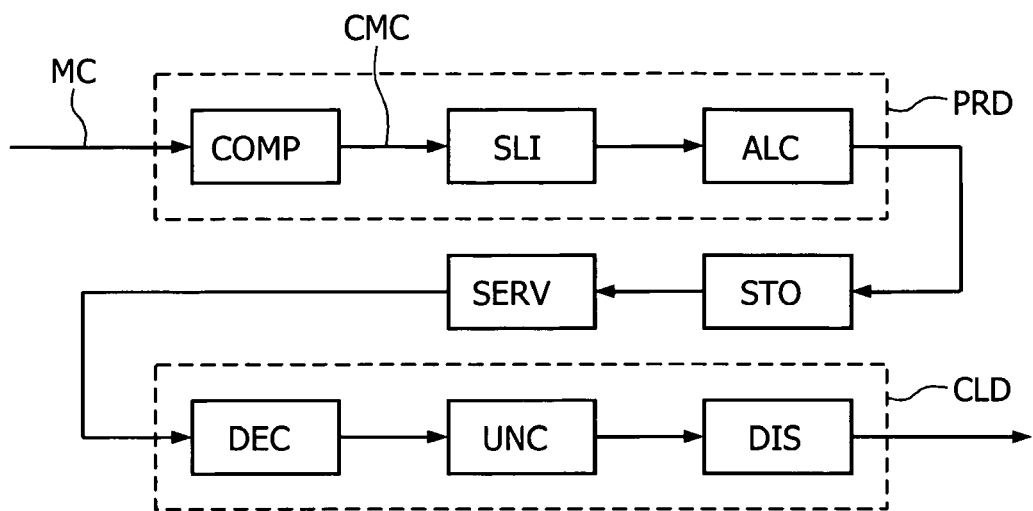
FIG. 1 is a block diagram of a system in accordance with the invention, for distributing multimedia content to at least one client device over a network.

Referring to FIG. 1, a system for distributing multimedia content to at least one client device is described.

The multimedia content may be any multimedia content that is transmitted and can be received by a number of receivers including the receiver CLD. The multimedia content may be, for instance, a television program, a pre-recorded event/program, a live event, etc. In the following example, the multimedia content is under a compressed format. But it will be apparent to a person skilled in the art that said multimedia content does not need to be compressed for a proper operation of the distribution system in accordance with the invention.

Such a distribution system comprises:
  a data compressor COMP for compressing the multimedia content MC;
  a slicer SLI for slicing the compressed multimedia content into a set of slices;
  a coder ALC for coding a slice according to an asynchronous layer coding technique such that N coded symbols including K source symbols and N−K error symbols are generated;

a storage unit STO for storing the set of coded slices associated with the multimedia content;

a content server SER for receiving the set of coded slices from the storage unit, and for transmitting said set of coded slices to a client device upon request;

a client device CLD including:

a communication unit (not represented) for receiving the coded slices;

a decoder DEC for decoding a slice as soon as K coded symbols of said slice have been received, the received symbols being source symbols or correction symbols;

a data decompressor UNC for decompressing the decoded slices;

a player DIS for playing the decompressed multimedia content in the display order.

The data compressor is responsible for compressing the received multimedia content. The data compressor is compliant, for instance, with one of the MPEG standards, or with H.263.

Figure 2:
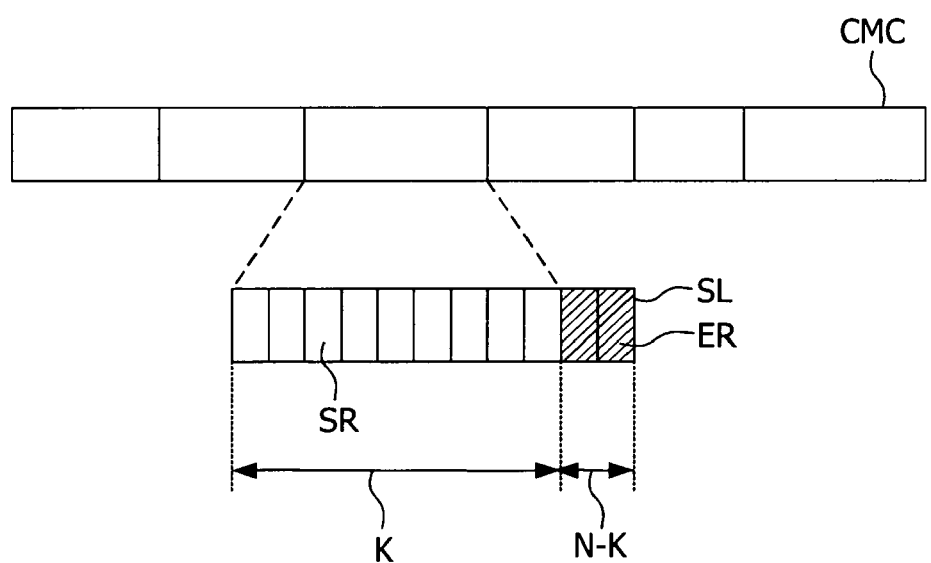
FIG. 2 shows the decomposition of a multimedia content into slices and symbols.

The slicer has the following functions:

it slices (i.e. divides) the compressed multimedia content CMC generated by the data compressor into a plurality of slices SL, as shown in FIG. 2, where each slice comprises a given amount of time of the compressed multimedia content.

it generates a file from each slice.

According to an embodiment of the invention, the slices are generated in such a way that they can be decompressed independently of each other. In practice, any compressed multimedia content generated by a multimedia data compressor comprises so-called Random Access Points (RAP). In order to produce slices that can be decompressed independently of the others, the slicer slices the compressed multimedia content in such a way that each slice starts with a Random Access Point. For instance, when the data compressor is compliant with the MPEG-2 or MPEG-4 standard, the random access points are the I-frames of the MPEG compressed multimedia content, and the slicing positions are chosen in such a way that the first frame of each slice is an I-frame.

The coder ALC works according to the following principle:

a slice (or file) is split into K components hereinafter referred to as source symbols SR, as shown in FIG. 2;

these components are used in the coder to produce N–K additional components hereinafter referred to as error symbols ER, as shown in FIG. 2, the resulting N components being hereinafter referred to as coded symbols;

the N symbols are broadcasted.

The coder ALC is based on FEC (for Forward Error Correction) coding, for example XOR, Reed-Salomon RS, Tornado or Luby Transform LT coding.

The data compressor, slicer and coder are either implemented in a single device PRD or in separate devices. In both cases, what is transmitted from the data compressor to the slicer is a compressed video stream. Advantageously, this compressed video stream is transmitted from the data compressor to the slicer and then to the coder using the RTP (for Real-time Transfer Protocol) protocol. This is not restrictive. By way of example, the transport layer of the MPEG-2 standard, known as MPEG-2 TS, could be used as well.

In practice, the files generated by the coder ALC are stored in a storage unit to which the content server has access. The storage unit is shared by the processing device including the coder ALC and the content server. The storage unit may be part of the content server or can be located remotely.

The storage unit has to be cleaned on a regular basis to ensure that there is room available for storing the newly generated files. A way of cleaning the storage unit is to re-use file names on a regular basis. An alternative way is to use different file names for each file, and to delete the aging files on a regular basis.

The content server is linked to the client device via a distribution network. The distribution network is typically the Internet network. An access provider is adapted to provide the client device with an access to the distribution network. The transmissions between the content server and the client device via the distribution network are ruled by the FTP (for File Transfer Protocol) or HTTP (for Hyper Text Transfer Protocol) protocol.

The client device has amongst other means a communication unit for transmission/reception to/from the access provider. Typically, the client device sends a request to the content server directed to a predetermined multimedia content. Then the content server sends the multimedia content in the form of coded slices, as described before. Finally, the client device sends an acknowledgment to the content server indicating that the download was successfully completed.

The client device further comprises a symmetric FEC decoder for decoding the coded slices received by the communication unit. In more detail, after receiving at least K coded symbols, but any of the N coded symbols, said decoder reconstructs the K source symbols on the basis of the K received coded symbols, and therefore the original slice, according to a principle known to a person skilled in the art depending on the type of coding used (XOR, RS, LT or Tornado).

The client device includes means for decompressing a compressed multimedia content (e.g. a MPEG decoder for a MPEG stream), and a player for rendering and displaying the decompressed multimedia content.

The client device may be either a mobile device (like a mobile phone), in which case the communication unit is a radio communication unit, or a wired device (like a PC), in which case the communication unit is a wired communication unit.

The principle of the invention is illustrated by the two following examples.

According to a first example, a movie of 600 MB (for MegaBytes) and 80 minutes is first split into 80 slices of 1 minute and 7.5 MB corresponding to K=5000 symbols if a symbol contains 1500 bytes, which is a nice size for an IP (for Internet Protocol) packet. Then, each slice is coded using an asynchronous layer coding technique, such as Tornado or Luby Transform coding, into N=5500 coded symbols (5000 source symbols and 500, i.e. 10%, error symbols). These coded symbols are sent at a predetermined bit rate, for example, 1.1 Mb/s. The transmission bit rate of 1.1 Mb/s (for Megabit per second) is chosen to ensure quasi real time display of the said movie, so that it enables to do "live" with short delays (this is live to download). Said transmission bit rate is equal to N/K*R where R is the compression bit rate equal to 7,5*8=60 Mb/min or 1 Mb/s.

According to a second example, the 600 MB and 80 minutes movie is first split in 1600 slices of 375 kB (for kilobytes) and 3 seconds. Then each such slice is coded using an asynchronous layer coding technique, such as XOR or Reed Salomon coding, into K=250 source symbols of 1500 bytes, leading to N=275 coded symbols if 10%, i.e. 25, error symbols are generated by the coding. These coded symbols are sent at a predetermined bit rate, for example, 1.1 Mb/s. Compared with the first example, the computing complexity is reduced, due to the lower value of K.

After a short time (first example=1 minute, second example=3 seconds) the client device will have received at least K coded symbols if the average loss rate is less than 10%, which means that the decoder included in the client device can rebuild the first slice, and that media decoding and playback can start. In the mean time the reception of the next slice similarly coded can start and so on. Thanks to this, the principle of progressive download can be applied to massively scalable broadcast.

Furthermore, if the network has a lot of bandwidth the slices can be simulcasted, i.e. broadcasted simultaneously, (e.g. 80 channels in the first example) so that:
- after a maximum waiting time of 1 minute for the first example, any receiver can start decoding and playback since all the slices are simulcasted;
- after a maximum waiting time of 1 minute for the first example, a high-end receiver that can receive and store all the traffic, has received the whole movie;
- the system can be scaled to adapt to the local network capacity, for example if the local network does not sustain the full bandwidth (88 Mb/s in the first example) the last-hop router (for example an internet service provider, a regional router, or a router in the basement of the client device building) can select a given number of channels adapted to its bandwidth;
- in all cases a single content server can be used.

Several embodiments of the present invention have been described above by way of examples only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. A method of distributing multimedia content to at least one client device, comprising:
   slicing the multimedia content into a set of slices;
   coding a slice according to an asynchronous layer coding technique such that N coded symbols including K source symbols and N−K error symbols are generated;
   transmitting said coded slices upon request of the client device;
   receiving said coded slices on a client device;
   decoding a coded slice on said client device as soon as K coded symbols of said slice have been received;
   wherein the multimedia content is under a compressed format; and
   wherein the multimedia content is compressed at a bit rate R and wherein the coded slices are transmitted at a bit rate N/K*R.

2. A method as claimed in any one of claim 1, wherein the step of slicing is adapted to divide the compressed multimedia content into a set of slices which can be decompressed independently.

3. A method as claimed in claim 1, wherein the coded slices are transmitted over different channels and wherein said method further comprises the step of buffering decoded slices on the client device.

4. A system for distributing multimedia content to at least one client device over a network, comprising:
   a slicer for slicing the multimedia content into a set of slices;
   a coder for coding a slice according to an asynchronous layer coding technique such that N coded symbols including K source symbols and N−K error symbols are generated;
   a content server for storing and transmitting said coded slices upon request of the client device;
   a client device comprising means for receiving said coded slices and a decoder for decoding a coded slice as soon as K coded symbols of said slice have been received;
   wherein the multimedia content is under a compressed format; and
   wherein the multimedia content is compressed at a bit rate R and wherein the coded slices are transmitted at a bit rate N/K*R.

5. A client device for downloading multimedia content from a content server, said multimedia content being sliced into a set of slices, a slice being further coded according to an asynchronous layer coding technique such that N coded symbols including K source symbols and N−K error symbols are generated, said device comprising:
   means for receiving said coded slices; and
   a decoder for decoding a coded slice as soon as K coded symbols of said slice have been received;
   wherein the multimedia content is under a compressed format; and
   wherein the multimedia content is compressed at a bit rate R and wherein the coded slices are transmitted at a bit rate N/K*R.

6. A device for processing multimedia content, comprising:
   a slicer for slicing the multimedia content into a set of slices;
   an ALC coder for coding a slice according to an asynchronous layer coding technique such that N coded symbols including K source symbols and N−K error symbols are generated and transmitted over a network;
   wherein the multimedia content is under a compressed format; and
   wherein the multimedia content is compressed at a bit rate R and wherein the coded slices are transmitted at a bit rate N/K*R.

* * * * *